United States Patent [19]

Williamson

[11] Patent Number: 4,838,700

[45] Date of Patent: Jun. 13, 1989

[54] ASSEMBLIES FOR A WORM PRESS

[76] Inventor: Kirk E. Williamson, P.O. Box 1122, Luling, Tex. 78648

[21] Appl. No.: 44,197

[22] Filed: Apr. 30, 1987

[51] Int. Cl.[4] .......... B01F 7/08; B29B 1/06

[52] U.S. Cl. .......... 366/89; 100/117; 100/145; 198/666; 198/677; 366/79; 366/90; 366/318; 366/323; 425/208

[58] Field of Search .......... 366/79-82, 366/90, 89, 100, 318, 319, 321-324, 331; 100/117, 145, 146; 198/677, 676, 666; 425/207-209

[56] References Cited

U.S. PATENT DOCUMENTS

| | | | |
|---|---|---|---|
| 3,069,873 | 12/1962 | Whitlock | 100/145 |
| 3,289,819 | 12/1966 | Steinmetz | 198/666 |
| 3,592,128 | 7/1971 | French | 100/145 |
| 3,884,452 | 5/1975 | Britten et al. | 366/100 X |
| 4,202,633 | 5/1980 | Anders | 366/79 |
| 4,330,215 | 5/1982 | Gale | 366/331 X |
| 4,440,076 | 4/1984 | Mansfield | 100/117 |
| 4,624,577 | 11/1986 | Vannier et al. | 198/677 X |
| 4,691,818 | 9/1987 | Weber | 198/677 X |
| 4,697,928 | 10/1987 | Csongor | 366/90 |

*Primary Examiner*—Timothy F. Simone

*Attorney, Agent, or Firm*—Penrose, Lucas Albright

[57] ABSTRACT

This invention is directed to a worm shaft assembly used to move corrosive and/or abrasive material such is part of an extrusion device or a press. More particularly, it relates to the construction of flights, feed quills and intermediate rings or collars for mechanical presses and extrusion devices.

15 Claims, 1 Drawing Sheet

ASSEMBLIES FOR A WORM PRESS

FIELD OF THE INVENTION

This invention is directed to a worm shaft assembly, used to move corrosive and/or abrasive material such is part of an extrusion device or a press. More particularly, it relates to the construction of flights, feed quills and intermediate rings or collars for mechanical presses and extrusion devices.

BACKGROUND OF THE INVENTION

For various industrial processes it is frequently necessary to move or press, or both, materials which are corrosive or abrasive and this often must be accomplished at relatively high temperatures. Extrusion machines are an example wherein the most commonly used machines are single screw or worm shaft extruders. Material is normally added in granular or powder form via a hopper and is moved by a coarse-pitched archimedean screw rotating in a barrel which may be electrically heated. Such archimedean screws are considered to have three sections. The first section is a feed section which conveys solid material from wherever it is being fed into the machine and here the screw has a channel depth that is generally uniform and relatively large. Subsequent compression occurs in a compression section which has reducing channel depth and is intended to compact and force the material into contact through the barrel to encourage heating. Melting may be achieved by a combination of heat conducted from the barrel and heat generated by the shearing the molten layer formed between the barrel and the solid material. There is also a third metering section in which the channel depth of the screw is constant and relatively small. Its purpose is to control the output from the extruder in terms of quantity, steadiness and homogeneity. Further, the relative motion between the screw and the barrel creates an efficient mixing action in the melted material and is also capable of generating necessary pressures for extrusion. Both the barrels and the screws are composed of a hardened and/or corrosive resistant material to minimize wear and corrosion. The screw threads, known as flights, may be arranged to be continuous, but need not be continuous for the conveying and compaction of the material to occur.

Heretofore, the flights, feed quills, worms, collars and intermediate rings for worm shaft assemblies have been manufactured by arc welding or casting a corrosive or abrasive resistant material such as cobalt onto a base or hub of steel or other suitable material. These parts are very expensive. They are difficult to weld successfully because of dissimilar metals. The corrosive or abrasive resistant material often cannot be successfully welded to the desired material for the hub. The relatively thin overlay deposited by the welding technique tends to wear more quickly, depending on the environment, and where it wears through to the base, the overlay tends to strip or peel. Because the weld is very expensive to repair, the component is usually disposed of and replaced, the cost of reclaiming the overlay being too great to justify salvage attempts.

In the casting process, the outer shell is first cast in the desired configuration, machined and then pressed onto the hub where it is welded in place. Although the wearlife of the component is increased, it is more expensive than the arc welded structure and its cost of salvage also tends to be uneconomical.

Assemblies of the components are used in a great variety of manufacturing processes in plastics, rubber, paper, meat rendering, and other industries, and for pelletizing, oil feed processes and the like. They may be used to provide pressures up to fifteen hundred pounds per square inch and the materials being processed may range from quite cold to relatively high temperatures such as 450° F. The wear surface is usually cobalt, but may be other thin materials such as nickel and iron based alloys which are wear or corrosion resistant or both.

SUMMARY OF THE INVENTION

The shaft for a worm press that conforms to the present invention is formed by casting separate cobalt flights and collars or rings which are keyed onto respective hubs where they are secured in place by retainers. The hubs are then keyed to the drive shaft. The retainers are secured to the hubs by a bolt-in system and the outer shell component is closely and slidably received by the hub and retained in place by one or more keyways in the hub and by the retainer. The outer shell may alternatively be connected to the hub by a bolt system. The outer shell component may be removed from the hub and replaced by a like component. An assembly comprising the machined outer shell component, the hub and the retainer can be manufactured for about one-half the cost of prior art structures. For the same purpose, the outer shell component can be removed and replaced by another like component at substantially less cost. The outer shell material can be changed, if desired, to be compatible with a change in process material and replacement savings to the operator are substantial, also conserves use of expensive materials and alloys by permitting the complete salvage of the material of which the outer shell is composed.

It is therefore an object of the invention to provide assemblies for worm presses and the like which may be manufactured relatively easily, using where appropriate mass production techniques, and which are comparatively inexpensive.

Another object is to provide a press-shaft assembly by which the portion of the assembly composed of cobalt or other material may be easily replaced at substantially less cost than a new assembly.

Still another object is to provide an assembly which avoids the necessity of welding any parts together.

Yet another object is to provide an assembly which can be easily assembled for use and disassembled for repairs and maintenance as necessary.

Further objects, adaptabilities and capabilities of the invention will be recognized by those skilled in the art, based on their understanding of the invention from the disclosure herein and from the description that follows, reference being made to the accompanying drawings in which:

DETAILED DESCRIPTION OF THE PREFERRED EMBODIMENTS

Figures 1, 2, 3, 4, 5:
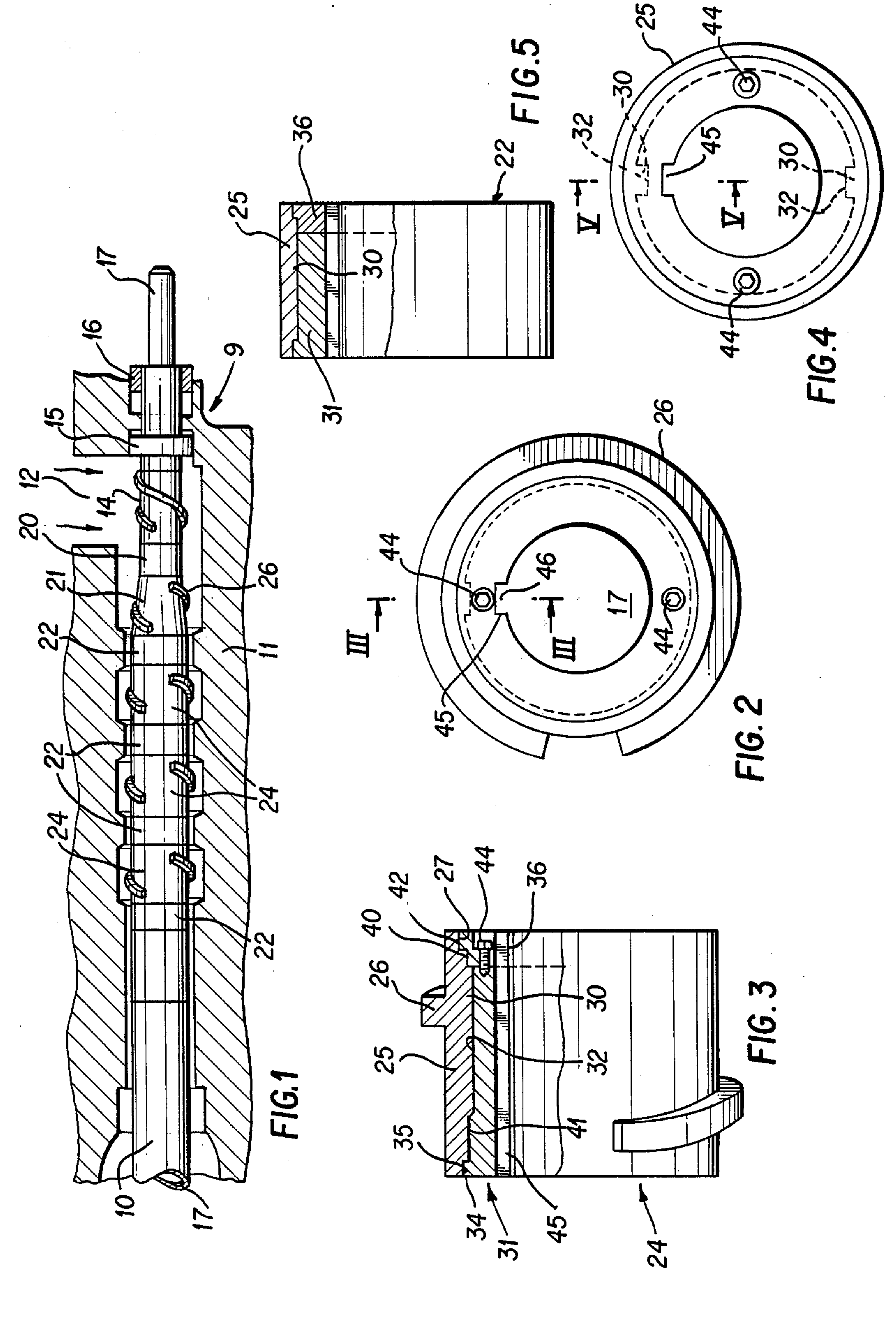
FIG. 1 is a partial cross sectional view illustrating a worm shaft with assemblies in accordance with the invention included thereon, within the barrel for extruding different types of material.
FIG. 2 is an end view of a cobalt flight assembly in accordance with the invention.
FIG. 3 is a partial cross sectional view of the flight assembly comprising a cobalt flight body mounted on a hub and held in place by a retainer taken along Section lines III—III of FIG. 2.
FIG. 4 is an end view of a modification in the form of a ring or collar assembly mounted on a hub which shows two keys or splines on the cobalt ring component and two mating keyways in the hub, the two splines on the cobalt body being 90° on the opposite sides of the inner surface keyway in the hub.
FIG. 5 is a cross sectional view taken on lines V—V of FIG. 4.

Referring to the drawings, FIG. 1 depicts a main work shaft 10 in an expeller 9 for an extrusion process in a press barrel 11. Expeller 9 includes an inlet 12 into which the material is fed for extruding. Within inlet 12 is a feed quill 14. To the left of feed quill 14, as seen in FIG. 1, is a spacer ring 20 and to the left thereof is a middle flight assembly 21 which diverges from its small diameter end section to a larger diameter end section. To the right of quill 14, as seen in FIG. 1, is a flanged barrier ring 15 which is surrounded on its right hand extremity with a packing ring 16. Extending further to the right from main worm shaft 10 is a grooved drive shaft 17 which receives a main drive gear, not shown. This exposed connect to which the lead line of reference numeral 17 extends is the end portion of the internal drive shaft 17 which extends through the flight and ring assemblies. To the left of flight assembly 21, as seen in FIG. 1, are three large diameter ring assemblies 22 alternately followed by three flight assemblies 24 and finally a further ring assembly 22. Components 14, 20, 21, 22 and 24 together comprise the worm shaft. Each of the assemblies in the worm shaft is formed with a cast cobalt tubular body 25. The feed quill 14 and each of the flight assemblies 21 and 24 have cylindrical helix portions 26 cast thereon which cooperate with the barrel 11 to feed the material from the inlet 12 to the outlet of the expeller while progressively compressing and working the material. As shown in FIG. 3, the cast cobalt body 25 is machined on its exterior and also on its opposite edges to provide a shoulder 27 at each end. On its inner surface, a key 30 has been cast along a portion thereof. In practice, it has been found unnecessary to machine the interior of cobalt body 25 including key 30 whereby production costs are reduced and cobalt is eventually more efficiently recovered. Each cast tubular cobalt body 25 is secured onto a hub 31 which is provided with a keyway 32 within which the key 30 cast on the interior of cobalt body 25 fits. Hub 31 is provided with an annular shoulder 34 on one end that interfits onto the annular shoulder 35 of cobalt body 25. That cobalt body 25 is held on hub 31 by a retainer ring 36 which has stepped annular shoulders of different diameters. The inner such shoulder 40 fits into the inner cylindrical surface 41 of cobalt body 25 and the outer shoulder 42 fits into the shoulder 27 on the end of the cobalt body 25. A pair of bolts 44 are provided to hold retainer ring 36 in place by passing through apertures in retainer ring 36 and being threaded into hub 31. The outer facial surfaces of the shoulder ends of hub 31 and of retainer ring 36 are aligned with the mating facial end of cobalt body 25 to form a smooth end face for the assembly 24. Hub 31 is provided with a keyway 45 on its inner surface which receives a key 46 directed in an axial direction on the drive shaft 17. Retainer 36 also has a corresponding keyway 46.

FIGS. 4 and 5 are directed to a ring member 22 which has a cylindrical cobalt body 25 without, however, a helix part 26. As shown in FIG. 4, the cast cobalt body 25 includes two inwardly directed oppositely disposed keys 30 which interfit into keyways 32 in the outer surface of the hub 31. The hub 31 is provided with one keyway 45 on its inner surface.

By casting the outer comminuting or pressure body, it is formed and replaced more easily. Further, it is usually much less expensive to replace the outer body than to repair prior art assemblies which are welded together.

The invention may be embodied in other specific forms without departing from the spirit or essential characteristics thereof. For example, the body 25 may be composed of other material known for this purpose such as certain high nickel alloys and also of certain ceramic materials which, due to their hardness and compression strength as well as their high temperature characteristics, may be used. For such latter use, the helix portion and keys are preferably curved in cross section to direct forces acting thereon inwardly and to avoid the imposition of local forces of tension or shear. The positions and number of bolts 44 may be different than shown and, in fact, usually will not be immediately under key 30 as shown, for convenience, in FIG. 3. Also, of course, more keys 30 may be employed, but two are preferred as shown in FIG. 4.

In an example of the flight body composed of cobalt, it is basically a cylinder which is 8.5 inches in diameter and has an internal diameter of 7.5 inches minimum. The flight has a length of 7.5 inches and a four pitch right hand thread which has an overall diameter of 9.934 inches. The threads are rectangular in cross-section having a width of about one inch. Such flight body is received on a hub composed of 1018/1026 steel which has an exterior diameter of 7.75 inches and an interior diameter of 4.76 inches. The length of the hub is 7.63 inches and it has offset shoulders extending outward from each end of 0.38 inches and machined to a depth of 0.38 inches. Retainers are received over both such shoulders and such retainers may, incidentally, also be composed of cobalt. For a hub as shown in FIGS. 4 and 5 the overall diameter including that of angular shoulder 34 is 8.25 inches and the interior diameter of the hub is 4.763 inches. The overall length may be 6.625 inches. In such case, the length of the key way is 5.125 inches and the width of shoulder 34 is 0.5 inches. Retainer ring in such case may be one inch in thickness with each shoulder 40 and 42 being one-half inch in thickness and the step being 0.25 inches. The helix or thread portions generally extend around each flight about 340° and may terminate about one to 1.25 inches from the edges. However, as previously noted, the threads can be formed in the various assemblies so that, without ring members interposed between the flights, the effect is that of a continuous archimedean screw.

The present embodiment therefore should be considered as essentially illustrative to enable those skilled in the art to make and use same and to set forth the best mode presently contemplated for carrying out the invention, but not restricted thereof, the scope of the invention being indicated by the appended claims rather than by the foregoing description, and all potential modifications which come within the appropriate meanings and recognized range of equivalency of the claims are intended to be embraced therein.

Having disclosed my invention, what I claim as new and to be secured by Letters Patent of the United States is:

1. For combination with a worm type press or conveyor:

a hub, said hub having at least one keyway;

a cast tubular body composed of a material which is wear resistant or corrosion resistant or both, having end and inner and outer surfaces, said end surfaces each having an outwardly extending shoulder and at least one protruding axially extending key along said inner surface, said at least one key fitting into said at least one keyway in said hub;

an annular shoulder on one end of said hub that seats in said outwardly extending shoulder on one end of said cast tubular body, said cast tubular body further comprising a worm flight along said outer surface;

a retainer ring to secure said cast tubular body onto said hub to which said tubular body is adapted to fit;

and a shaft for driving said hub.

2. A cast tubular body in accordance with claim 1, in combination with a further like cast tubular body, said cast tubular bodies being disposed on a common rotary axis.

3. A combination in accordance with claim 2, in which said cast tubular bodies have different thickness and different outer diameters.

4. An assembly in accordance with claim 1 wherein:

said hub includes at least one keyway on its inner surface for receiving a key on a drive shaft upon which a plurality of like said assemblies are mounted.

5. A screw for an extrusion type device which comprises a shaft having at least one key on its outer surface, a plurality of flight tubular bodies having a radial protusion defining a cylindrical helix, each said body composed of a single piece of integral cast material which is resistant to wear or to corrosion or both, a plurality of hubs, a plurality of retainer rings, each of said plurality of flight bodies being cast with inner, outer and end surfaces, said inner surface of each of said flight bodies having a radial shoulder on each end, and at least one axially extending key, said outer surface, being machined including said helix protrusion, each of said hubs having a length less than that of each of said flight tubular bodies with a radially extending machined shoulder on one outer end surface that interfits with one of said shoulders on said flight tubular body, each of said hubs including at least one axially extending keyway on its outer and inner surface that match said keys on said flight tubular bodies and on said shaft, said retainer ring having radial shoulders that match said shoulders on one end of said flight tubular body, bolt means for securing said retainer ring onto said flight tubular body and said hub securing said flight tubular body onto said hub, whereby said flight tubular bodies secured onto said hubs are placed end-to-end on said shaft to form said screw.

6. A screw according to claim 5, wherein said flight tubular bodies have different thicknesses.

7. For combination with a worm type press or conveyor, an assembly comprising a cast tubular body composed of cobalt, a tubular hub which receives said cast tubular body, said tubular hub being removably mounted on an internal drive shaft and connection means for securing said cast tubular body around said tubular hub in a rigid relationship, said connection means comprising a spline and keyway connection between said cast tubular body and said hub, a retainer ring, and bolt means for bolting said retainer ring to said hub, said bolt means comprising means for readily connecting and disconnecting said cast tubular body to said hub.

8. An assembly in accordance with claim 7 wherein said spline is integral with and the same material as said cast tubular body.

9. An assembly in accordance with claim 8 comprising a helix thread on the exterior of said cast tubular body.

10. An assembly in accordance with claim 9 wherein said helix thread extends about 340° around said cast tubular body.

11. An assembly in accordance with claim 7 wherein the interior of said cast tubular body is substantially in its as-cast condition.

12. For combination with a worm type press or conveyor, an assembly comprising a cast tubular body composed of a ceramic material, a tubular hub which receives said cast tubular body, said tubular hub being removably mounted on an internal drive shaft and connection means for securing said cast tubular body around said tubular hub in a rigid relationship, said connection means comprising a spline and keyway connection between said cast tubular body and said hub, a retainer ring, and bolt means for bolting said retainer ring to said hub, said bolt means comprising means for readily connecting and disconnecting said cast tubular body to said hub.

13. A work shaft for an expeller comprised of:

an internal drive shaft;

at least one tubular hub, said tubular hub being removably mounted on said internal drive shaft by a first means for ensuring said tubular hub rotates with said internal drive shaft;

at least one outer tubular part composed of a corrosion or abrasion resistant material, said outer tubular part being removably mounted on said tubular hub by a second means that ensures said outer tubular part rotates with the underlying said tubular hub and said internal drive shaft; and at least one retainer means, said retainer means being mounted on said internal drive shaft and removably attached to said tubular hub, said retainer means being received in said outer tubular part so that said part continuously covers and protects the outer circumference of said retainer means from materials being worked.

14. A work shaft for an expeller as claimed in claim 13 wherein said first and said second means are of axial slot and key configuration.

15. A work shaft for an expeller comprising:

an internal drive shaft;

multiple, removable hub sections, each said hub section slidably mounted on said internal drive shaft by means for preventing each said hub section from rotating independently of said internal drive shaft, a cast tubular part composed of a material which is corrosion and/or abrasion resistant being removably mounted in a fixed relationship on each said hub section; and means for retaining each pair of said hub and said cast tubular part in a fixed relationship so that a continuous shield comprised of the outer surfaces of each of said cast tubular parts protects all said hub sections, said retaining means, and said internal drive shaft from the corrosive or abrasive properties of material being worked by the work shaft during the expelling operation.

* * * * *